3,513,289
ARC WELDING ELECTRODES
Paul Desmond Blake, Bishops Stortford, and Roy Douglas Johnston, Ware, England, assignors to Murex Welding Processes Limited, Waltham-Cross, Hertfordshire, England, a British company
No Drawing. Filed Dec. 12, 1967, Ser. No. 689,802
Claims priority, application Great Britain, Dec. 29, 1966, 58,184/66
Int. Cl. B23k 35/22
U.S. Cl. 219—146                                    5 Claims

ABSTRACT OF THE DISCLOSURE

A tubular automatic or semi-automatic arc welding electrode consisting of a mild steel sheath enclosing a core containing, in proportions by weight of the electrode, 0.4–2.5% aluminum, 0.2–1.3% manganese, 0.2–0.7% fluorides and 0.1–0.4% of a potassium, rubidium or caesium compound.

---

The invention provides a tubular automatic or semi-automatic arc welding electrode capable of use without external shielding of the arc and consisting of a mild steel sheath enclosing a core containing aluminum, manganese, potassium and fluorides of alkali and/or alkaline earth metals, present in the amount of from 0.4–2.5% aluminum by weight of the electrode, 0.2–1.3% manganese by weight of the electrode, 0.2–0.7% of fluorides by weight of the electrode and 0.1–0.4% of potassium by weight of the electrode. If desired, the potassium may be replaced wholly or in part by rubidium or caesium. The potassium, rubidium or caesium is present in the electrode as a compound and not as metal. In order to avoid the necessity for making the core excessively small, the core will normally also contain iron powder. Such an electrode yields weld metal of good ductuility. If it is desired that the weld metal should have exceptional impact strength at atmospheric temperature or high impact strength at low temperatures the core will also contain nickel in an amount of 0.1–4.5% by weight of the electrode and in this case the manganese content of the electrode must not exceed 0.35% and preferably does not exceed 0.3% by weight of the electrode. The core of the electrode conveniently constitutes 20% by weight of the electrode, the balance of the core consisting of iron powder. The sheath may be formed from rimming steel strip containing less than 0.12% carbon, 0.2–0.6% manganese, less than 0.5% silison, less than 0.04% sulphur and less than 0.04% phosphorus or from killed or semi-killed strip with up to 0.3% silicon, up to 0.1% nickel, up to 1.8% manganese, less than 0.04% sulphur and less than 0.04% phosphorus. When the electrode contains nickel, the sheath should not contain more than 0.3% manganese and is preferably of rimming steel.

The above-described electrode provides weld metal of high ductility and this result is obtained when the weld metal contains 0.2–1% aluminum and 0.6–1.2% of manganese, the manganese content being less than 0.35% when the weld metal contains more than 0.1% nickel. Our tests have shown that the electrode gives sound, ductile weld metal which is resistant to cracking and which has an ultimate tensile strength of approximately 30 tons per square inch which is very suitable for most welded joints in mild steel. At the manganese range of 0.6–1.2%, nickel in the weld metal causes a sharp decrease in ductility and where ductility is the prime object the nickel content of the weld metal should be limited to 0.1%. Nickel however has a useful effect in increasing impact strength and we have found that high impact strength can be combined with an adequate degree of ductility by reducing manganese in the weld deposit to a maximum of 0.35% manganese. The fluorides of the alkaline earth or alkali metals present in the core of the electrode assist metal transfer to the weld deposit by stabilizing the arc and assist in providing a good wetting action by the weld metal during welding. 0.2% of fluorides is sufficient to achieve arc stability and it is undesirable to exceed 0.7% of fluorides. The potassium is preferably present in the core as potassium-titano fluoride, but may also be present as potassium silico-fluoride, or as potassium titanite. The electrode may contain up to 0.8% by weight of titanium which may conveniently be present in the core as a ferro titanium alloy containing, for example, 25% of titanium. Titanium will assist recovery of aluminum into the weld metal but when present in excess of 0.8% may itself be recovered to the detriment of the ductility and impact strength of the weld metal. Manganese and silicon may also be present in the core as ferro alloys, provided that the manganese remains within the stated range and provided that the amount of silicon does not exceed 1% by weight of the electrode and preferably does not exceed 0.5% by weight of the electrode. Silicon, when present, assists in giving tensile strength to the weld metal and assists in recovery of aluminum into the weld metal. The aluminum may be included in the core as a pure metal powder or as aluminum wire. It is, however, advantageous to include in the core an alloy of aluminum containing 2% of sodium and 0.5% of lithium since this gives improved metal transfer across the arc and a better appearance of the weld. Typical electrodes are as follows:

TABLE 1.—CORE COMPOSITION

|  | Electrode number (percent) | | | |
|---|---|---|---|---|
|  | 1 | 2 | 3 | 4 |
| Titanium as 25% ferro-alloy | 0.75 | 0.6 | 0.6 | 0.9 |
| Al or Al alloy | 5.4 | 6 | 6 | 6 |
| Mn as 80% ferro-alloy | 3 | 3.8 | Nil | Nil |
| Nickel | Nil | Nil | 4.5 | 6.0 |
| Silicon as 50% ferro-alloy | 1.2 | 0.9 | 0.9 | 1.0 |
| Lithium fluoride | 0.7 | 0.2 | Nil | Nil |
| Sodium fluoride | 0.5 | 0.2 | Nil | Nil |
| Potassium titano-fluoride | 0.7 | 1.0 | 1.0 | 1.4 |
| Caesium fluoride | 0.5 | 0.5 | 1.0 | 0.5 |
| Iron powder | Bal | Bal | Bal | Bal |

The above percentages are percentages by weight of the core, an din these electrodes the core constsitues 20% by weight of the electrode.

Table 2 shows the compositions of weld metal deposited from these electrodes.

TABLE 2.—WELD METAL COMPOSITIONS

|  | Electrode number (percent) | | | |
|---|---|---|---|---|
|  | 1 | 2 | 3 | 4 |
| Aluminum | 0.45 | 0.55 | 0.5 | 0.55 |
| Silicon | 0.2 | 0.15 | 0.15 | 0.15 |
| Manganese | 0.8 | 0.9 | 0.27 | 0.31 |
| Titanium | 0.05 | 0.04 | 0.04 | 0.05 |
| Nickel | 0.02 | 0.01 | 0.9 | 1.2 |
| Carbon | 0.05 | 0.05 | 0.07 | 0.08 |
| Sulphur | 0.02 | 0.02 | 0.018 | 0.018 |
| Phosphorus | 0.015 | 0.014 | 0.016 | 0.013 |
| Iron | Bal. | Bal. | Bal. | Bal |

The mechanical properties of the weld metal from these electrodes when tested according to the physical testing requirements of BS.639 are set out in Table 3.

TABLE 3

| | 1 | 2 | 3 | 4 |
|---|---|---|---|---|
| Yield Point, t.p.i.² | 26 | 27 | 29 | 30 |
| Ultimate tensile strength, t.s.i.² | 29 | 31 | 32 | 33 |
| Elongation on 2″ gauge length, percent | 21 | 23 | 21 | 19 |
| Reduction of area in percent | 47 | 45 | 43 | 39 |

The Charpy impact strengths of weld metal from electrodes 3 and 4 averaged 42 and 48 ft. lbs. respectively at 20° C., while the corresponding values of electrodes 1 and 2 were 25 and 30 ft. lbs.

What we claim as our invention and desire to secure by Letters Patent is:

1. A tubular automatic or semi-automatic arc welding electrode capable of use without external shielding of the arc and consisting of a mild steel sheath containing a core containing aluminum, manganese, potassium and fluorides of alkali and/or alkaline earth metals, present in the amount of from 0.4–2.5% aluminum by weight of the electrode, 0.2–1.3% manganese by weight of the electrode, 0.2–0.7% of fluorides by weight of the electrode and 0.1–4% of at least one metal selected from the group consisting of potassium, rubidium and caesium present in the electrode as a compound of said metal.

2. An electrode as claimed in claim 1, in which the core also contains nickel in an amount of 0.1–4.5% by weight of the electrode and the manganese content of the electrode does not exceed 0.35% by weight.

3. On electrode as claimed in claim 1, in which the core also contains titanium in an amount of up to 0.8% by weight of the electrode.

4. An electrode as claimed in claim 1, in which the core also contains iron powder.

5. An electrode as claimed in claim 4, in which the core constitutes 20% by weight of the electrode.

References Cited

UNITED STATES PATENTS 3,177,340  4/1965  Danhier _____ 219—146

ANTHONY BARTIS, Primary Examiner

L. A. ROUSE, Assistant Examiner